F. NAROBE.
FLYING MACHINE.
APPLICATION FILED AUG. 12, 1915.
1,189,612.
Patented July 4, 1916.
3 SHEETS—SHEET 3.
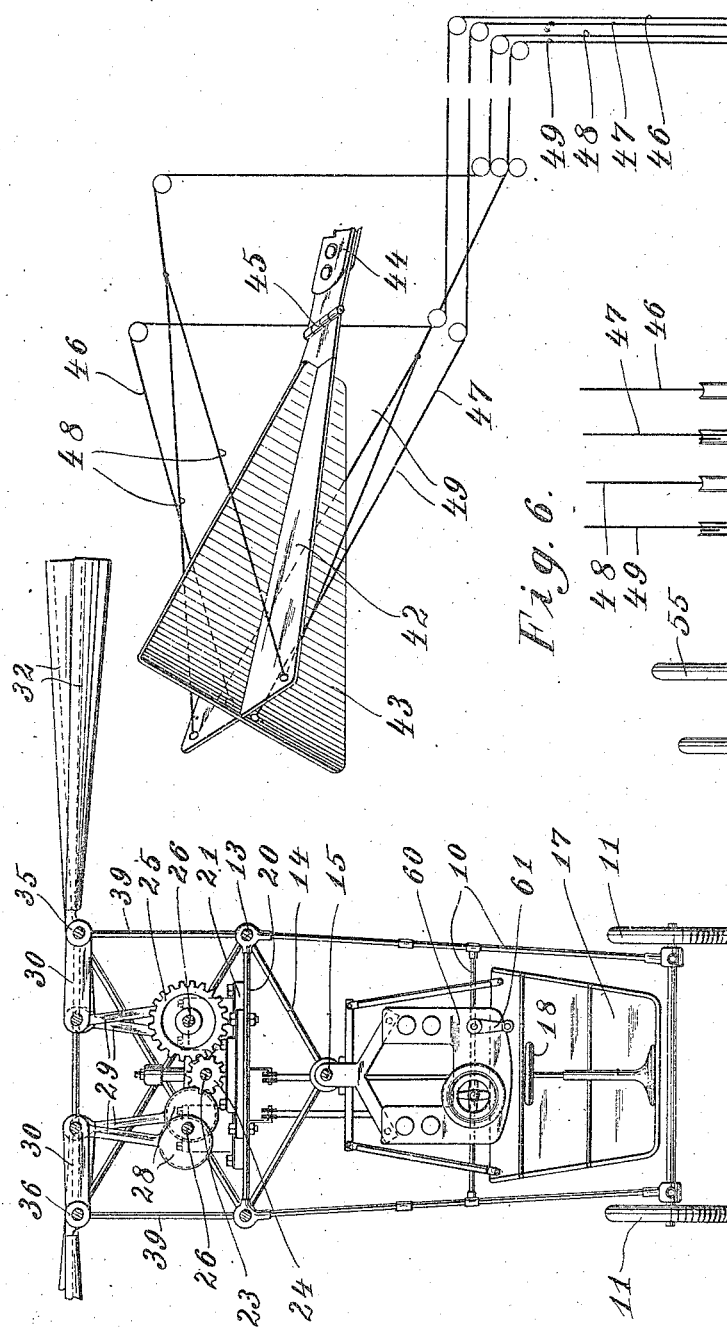
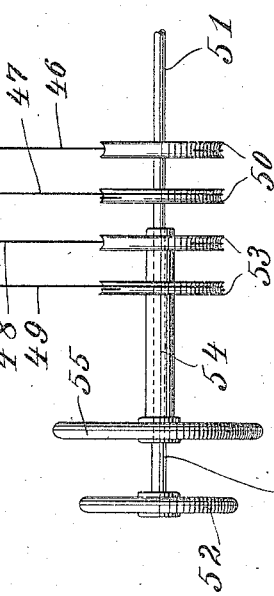
WITNESSES:
Richard Wegener
Fred. Rueger
INVENTOR
Frank Narobe
BY
Alexander Arnez
His ATTORNEY

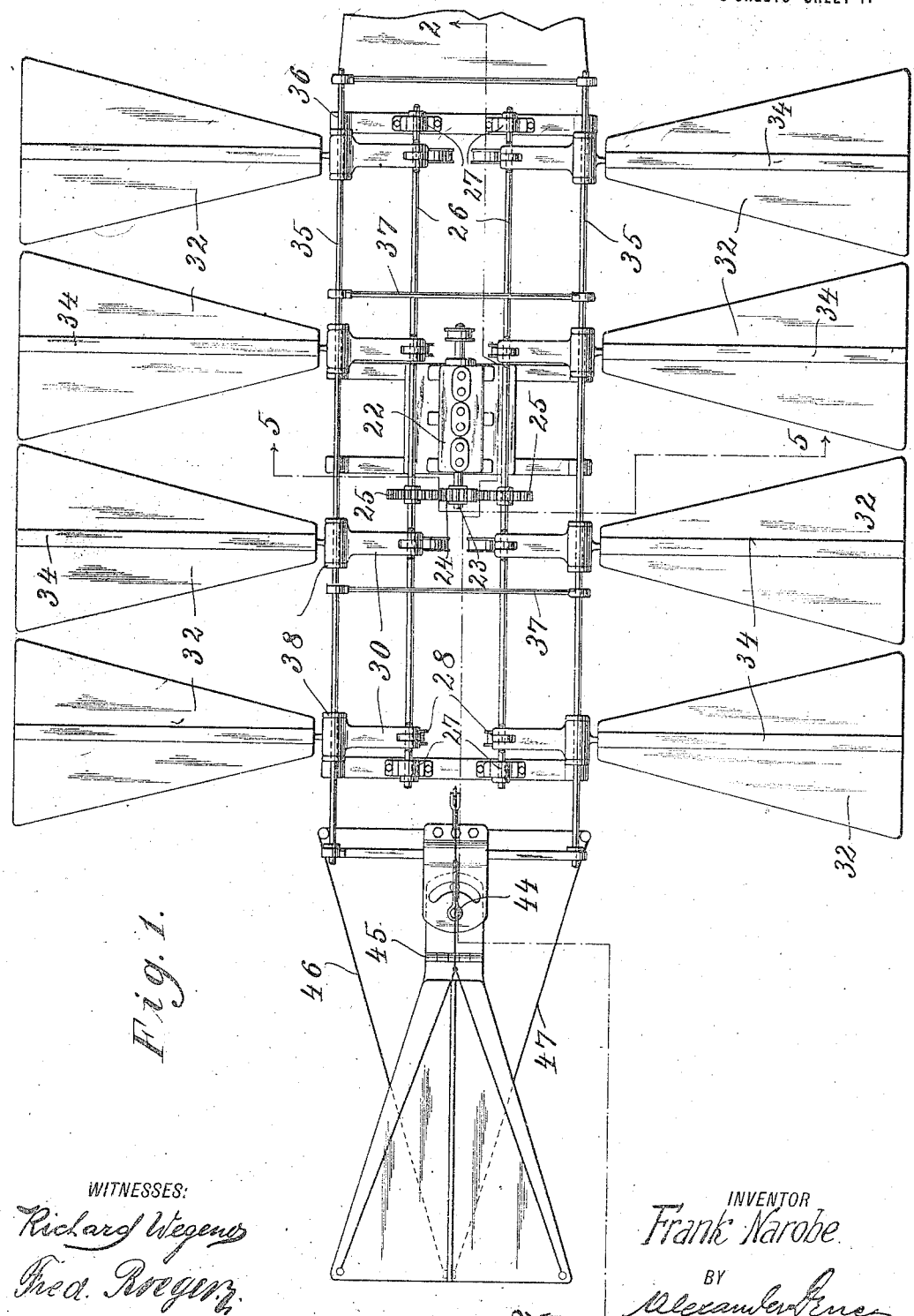

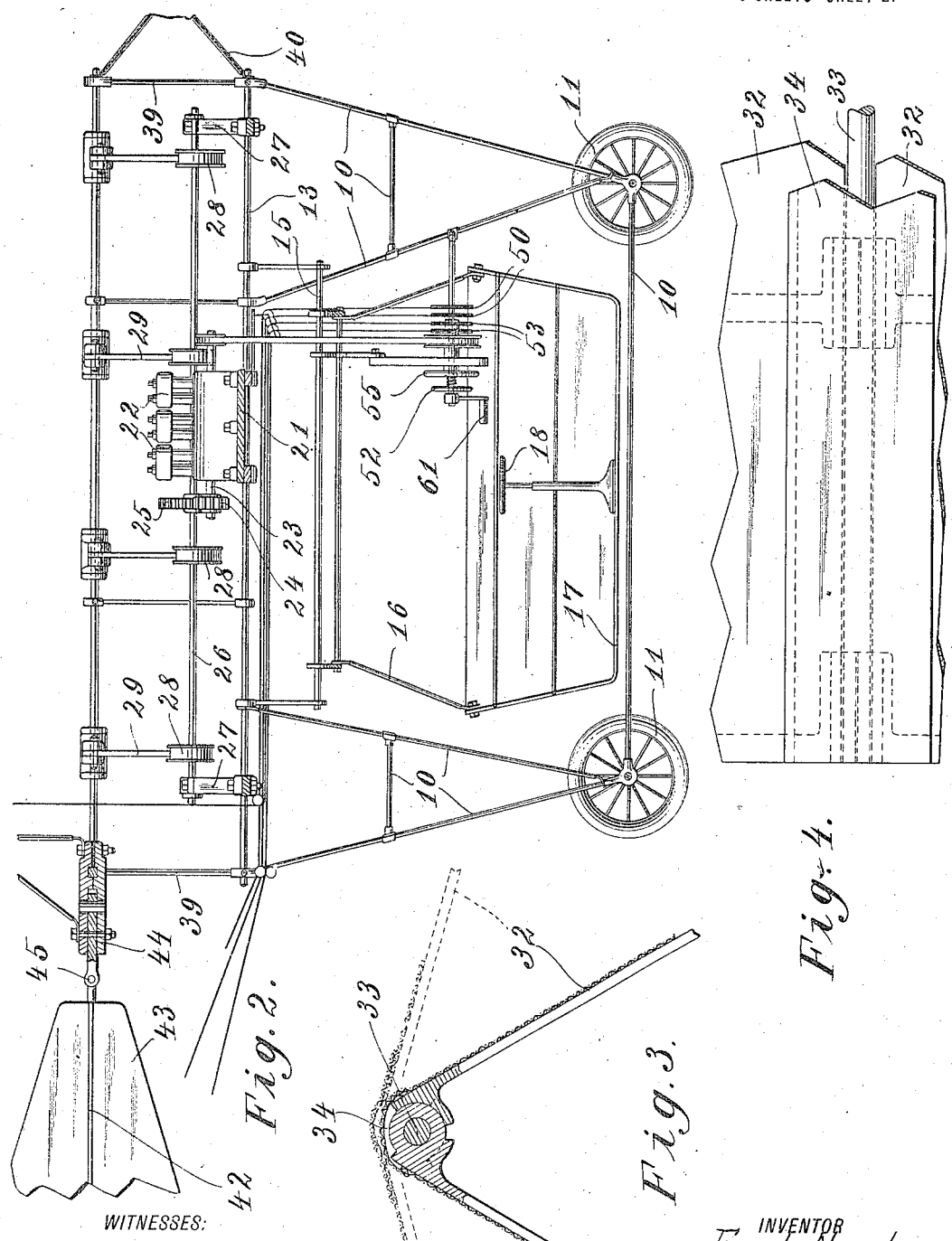

UNITED STATES PATENT OFFICE.

FRANK NAROBE, OF NEW YORK, N. Y.

FLYING-MACHINE.

1,189,612.   Specification of Letters Patent.   Patented July 4, 1916.

Application filed August 12, 1915. Serial No. 45,140.

*To all whom it may concern:*

Be it known that I, FRANK NAROBE, a subject of the Emperor of Austria-Hungary, residing at New York city, in the county of New York and State of New York, have invented new and useful Improvements in Flying-Machines, of which the following is a specification.

This invention relates to improvements in flying machines, of the "heavier than air" type, capable of raising and sustaining a considerable load in addition to its own weight.

One of the objects is to provide a machine which can rise in a substantially vertical plane from the ground to any desired altitude.

Another object is to combine with the machine a novel steering device by means of which the structure may be diverted both horizontally and laterally.

Still another object is to provide a structure that can be moved over the ground in the manner of a wheeled vehicle, having also a pendulous car which can be disengaged and used as a boat when required.

These and other objects are attained by the novel construction and combination of parts hereinafter described and shown in the accompanying drawings, presenting an embodiment of the invention, but which is subject to change within the scope of the claim hereto annexed.

In the drawings which form part of this specification:—Figure 1 is a plan view of a machine, illustrating the invention. Fig. 2 is a sectional view of the same, taken on line 2—2 of Fig. 1. Fig. 3 is an enlarged sectional view showing one of the raising or wing elements, indicating its operation. Fig. 4 is a partial top plan view of the same part. Fig. 5 is a vertical sectional view taken on line 5—5 of Fig. 1. Fig. 6 is a diagrammatic view of the steering vane and its attachments, and, Fig. 7 is a partial, enlarged side elevation of the steering control device.

The lower frame 10 is comprised of tubular elements rigidly stayed and braced as is usual with such constructions, mounted upon pairs of wheels 11 arranged at the ends and forming a truck by which the machine can be moved over any reasonably smooth and level surface in the manner of a common vehicle.

From the joints 13 extend diagonal arms 14, supporting a central longitudinal bar 15, upon which are pivotally engaged the arms 16 of the boat-like passenger cab or car 17: this cab is arranged so as to hang pendant in order that it will at all times be vertical, irrespective of rolling, swaying or tipping of the superstructure, and as indicated, may be provided with one or more seats 18. Extending between the joints 13 are transverse bars 20 upon which is a platform 21 supporting the motor 22 which may be of any approved type.

On the motor shaft 23 is a driving pinion 24, engaging a pair of spur gears 25, one on each side, the gears being rigidly mounted on horizontal shafts 26 disposed in parallel longitudinally of the machine and supported by bearings 27.

The shafts 26 have secured to them at spaced intervals eccentrics 28 from which extend upward connecting arms 29 hingedly engaging the inner lever ends 30 of the wings 32, the eccentrics being so arranged as to operate the wings alternately. As the wings are disposed in pairs, each extending outwardly, the downward effect of one is neutralized by the upward movement of its mate and so on throughout the several series of pairs employed.

The construction of the wing elements comprises a rigid center bar 33 upon which the movable side members 32 are hingedly joined so that the sides are capable of a movement indicated in Fig. 3, where the full lines indicate the wing position when moving upward and the broken lines the relative position when moving downward, the action of opening and closing being accomplished by their resistance to the air as they are actuated by the mechanism described. A flexible plate 34 extends over the front at the bar 33. These wings, which in plan view are essentially fan shaped, are pivoted on the rigid shafts 35 held in fixed bearings 36 at their ends and further braced by the tie rods 37, collars 38 being provided to prevent longitudinal displacement. All this superstructure is attached to the lower part of the machine, by means of the frames 39.

At one end of the machine is a convexly curved wind shield 40 and at the other is the steering apparatus, consisting of two triangular blades or plates, one 42, being disposed substantially horizontally and the other, 43, vertically. These blades can move laterally upon the joint 44, motion being communicated to them by means of cables 46 and 47 respectively as shown in Fig. 6 whereby a lateral rudder effect is obtained by reason of the cables being attached in such manner as to wind upon the drums 50, rigidly engaged upon the shaft 51 and actuated through the hand wheel 52. Similarly cables 48 are connected with the vertical rudder 43 and operated by the drums 53 on the sleeve 54 actuated by the hand wheel 55, it being understood that suitable pulleys are employed to conduct and guide the cables. Thus within the cab or boat 17, shown in skeleton form, is the steering gear and also upon the plate 60 the several instruments usually carried such as a clock, compass, barometer, thermometer and the like and also the crank 61 communicating with the motor and used for starting the same, all the control devices being convenient for operation.

Having thus described my invention and indicated the manner of its construction and use, what I claim as new and desire to secure by Letters Patent, is:—

In a flying machine, the combination with a frame, having truck wheels at its lower side, a boat body pendent in the frame above said truck, a motor, a pair of parallel horizontal shafts driven by said motor, a plurality of triangular, oppositely disposed wings extending from said frame, means for driving said wings from said shafts, means permitting said wings to partially fold on their upward movement and open as they move down, a steering rudder and means in said boat body for operating said motor and said rudder.

In testimony whereof I have signed my name to this specification.

FRANK NAROBE.